US012696288B2

(12) United States Patent
Liu et al.

(10) Patent No.: US 12,696,288 B2
(45) Date of Patent: Jul. 28, 2026

(54) RANDOM ACCESS METHOD AND DEVICE, AND STORAGE MEDIUM

(71) Applicant: Beijing Xiaomi Mobile Software Co., Ltd., Beijing (CN)

(72) Inventors: Xiaofei Liu, Beijing (CN); Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 384 days.

(21) Appl. No.: 18/263,944

(22) PCT Filed: Feb. 5, 2021

(86) PCT No.: PCT/CN2021/075607
§ 371 (c)(1),
(2) Date: Aug. 2, 2023

(87) PCT Pub. No.: WO2022/165764
PCT Pub. Date: Aug. 11, 2022

(65) Prior Publication Data
US 2024/0306209 A1     Sep. 12, 2024

(51) Int. Cl.
*H04W 72/231* (2023.01)
*H04W 74/00* (2009.01)
*H04W 74/0833* (2024.01)

(52) U.S. Cl.
CPC ....... *H04W 72/231* (2023.01); *H04W 74/006* (2013.01); *H04W 74/0833* (2013.01)

(58) Field of Classification Search
CPC ..... H04W 48/10; H04W 48/12; H04W 48/18; H04W 72/231; H04W 72/563; H04W 74/006; H04W 74/0833
See application file for complete search history.

(56) References Cited

U.S. PATENT DOCUMENTS

| | | | | |
|---|---|---|---|---|
| 9,253,798 B2 * | 2/2016 | Pani | | H04W 48/12 |
| 10,182,459 B2 * | 1/2019 | Murray | | H04B 7/0696 |

(Continued)

FOREIGN PATENT DOCUMENTS

| | | |
|---|---|---|
| CN | 108633106 A | 10/2018 |
| CN | 109644494 A | 4/2019 |

(Continued)

OTHER PUBLICATIONS

International Search Report and Written Opinion of International Application No. PCT/CN2021/075607, dated Nov. 10, 2021, 15 pages.

(Continued)

*Primary Examiner* — Eric Nowlin

(74) *Attorney, Agent, or Firm* — Finnegan, Henderson, Farabow, Garrett & Dunner, L.L.P.

(57) ABSTRACT

A random access method is applied to a user equipment (UE), and includes: receiving resource configuration information, wherein the resource configuration information is configured to configure resources in a specified random access resource pool corresponding to at least one network slice; determining a first random access resource based on slice information of a target network slice and the resource configuration information, wherein the target network slice is a network slice for the UE to initiate a random access; and initiating the random access based on the first random access resource.

20 Claims, 8 Drawing Sheets

(56) References Cited

U.S. PATENT DOCUMENTS

| | | | | |
|---|---|---|---|---|
| 10,616,926 | B2 * | 4/2020 | Murray | H04L 5/0023 |
| 10,849,166 | B2 * | 11/2020 | Murray | H04W 74/0833 |
| 11,284,438 | B2 * | 3/2022 | Li | H04W 72/23 |
| 12,010,726 | B2 * | 6/2024 | Wu | H04L 5/0044 |
| 12,127,271 | B2 * | 10/2024 | Enbuske | H04W 72/0446 |
| 12,289,791 | B2 * | 4/2025 | Awada | H04W 74/0841 |
| 2017/0367120 | A1 * | 12/2017 | Murray | H04W 72/046 |
| 2018/0103465 | A1 | 4/2018 | Agiwal et al. | |
| 2018/0192445 | A1 | 7/2018 | Jiang | |
| 2019/0098672 | A1 * | 3/2019 | Murray | H04W 72/046 |
| 2019/0320314 | A1 | 10/2019 | Yang | |
| 2020/0084805 | A1 * | 3/2020 | Li | H04W 72/0453 |
| 2020/0252976 | A1 * | 8/2020 | Murray | H04W 74/0833 |
| 2021/0345413 | A1 * | 11/2021 | Tang | H04W 48/10 |
| 2022/0070938 | A1 * | 3/2022 | Wu | H04L 5/0094 |
| 2022/0124814 | A1 * | 4/2022 | Uchino | H04W 74/004 |
| 2022/0124828 | A1 * | 4/2022 | Uchino | H04W 72/0446 |
| 2022/0217788 | A1 * | 7/2022 | Ohara | H04W 74/0841 |
| 2022/0264659 | A1 * | 8/2022 | Enbuske | H04W 72/0446 |
| 2022/0279408 | A1 * | 9/2022 | Awada | H04W 74/0838 |
| 2022/0295574 | A1 * | 9/2022 | Lin | H04W 74/0841 |
| 2023/0106898 | A1 * | 4/2023 | Jiang | H04W 74/0833 |
| | | | | 370/329 |
| 2023/0180300 | A1 * | 6/2023 | Lin | H04W 48/16 |
| | | | | 370/329 |
| 2023/0199859 | A1 * | 6/2023 | Li | H04W 74/0833 |
| | | | | 370/329 |
| 2024/0015784 | A1 * | 1/2024 | Cheng | H04W 48/18 |
| 2024/0049291 | A1 * | 2/2024 | Cheng | H04W 36/06 |
| 2024/0137990 | A1 * | 4/2024 | Christoffersson | |
| | | | | H04W 74/0833 |
| 2024/0237080 | A9 * | 7/2024 | Christoffersson | |
| | | | | H04W 74/0833 |
| 2024/0267955 | A1 * | 8/2024 | Jung | H04W 48/18 |
| 2024/0306209 | A1 * | 9/2024 | Liu | H04W 72/231 |
| 2024/0314847 | A1 * | 9/2024 | Gürsu | H04W 24/10 |
| 2024/0340963 | A1 * | 10/2024 | Liu | H04W 74/006 |

FOREIGN PATENT DOCUMENTS

| | | | |
|---|---|---|---|
| CN | 111557119 A | 8/2020 | |
| EP | 3473048 B1 * | 3/2024 | H04B 7/06966 |
| EP | 4346116 A2 * | 4/2024 | H04B 7/06966 |
| WO | WO-2017218762 A1 * | 12/2017 | H04W 72/046 |

OTHER PUBLICATIONS

Spreadtrum Communications, Consideration on slice based RACH configuration, 3GPP TSG-RAN WG2 Meeting #113 electronic, R2-2100662, Online, Jan. 25-Feb. 5, 2021, 3 pages.
"Considerations on the solutions of slice based RACH configuration", Xiaomi, 3GPP TSG-RAN2 #113e meeting, R2-2100424, Online, Jan. 25-Feb. 5, 2021, 7 pages.
"Discussion on candidate solutions of slice-based RACH", Qualcomm Incorporated, 3GPP TSG RAN WG2 Meeting #113-e, R2-2100129, E-Conference, Jan. 25-Feb. 5, 2021, 6 pages.
Notice of Reasons for Refusal issued by the Japanese Patent Office on Jun. 25, 2024, in corresponding Application No. JP 2023-547440, 6 pages.
Extended European Search Report issued in Application No. 21923780.7 dated Feb. 29, 2024, 12 pages.
ZTE Corporation, Sanechips, "Consideration on the slice specific RACH configuration," 3GPP TSG-RAN WG2 Meeting#112, R2-2009806, Electronics, Nov. 2-13, 2020, 4 pages.
Sony, "Consideration on fall back procedure from 2-step RACH to 4-step RACH," 3GPP TSG RAN WG2 Meeting #106, R2-1907046, Reno, USA, May 13-17, 2019, 4 pages.
Invitation to Respond to Written Opinion for Singapore Patent Application No. 11202305896S, dated Apr. 8, 2026, 1 11 pages.

* cited by examiner

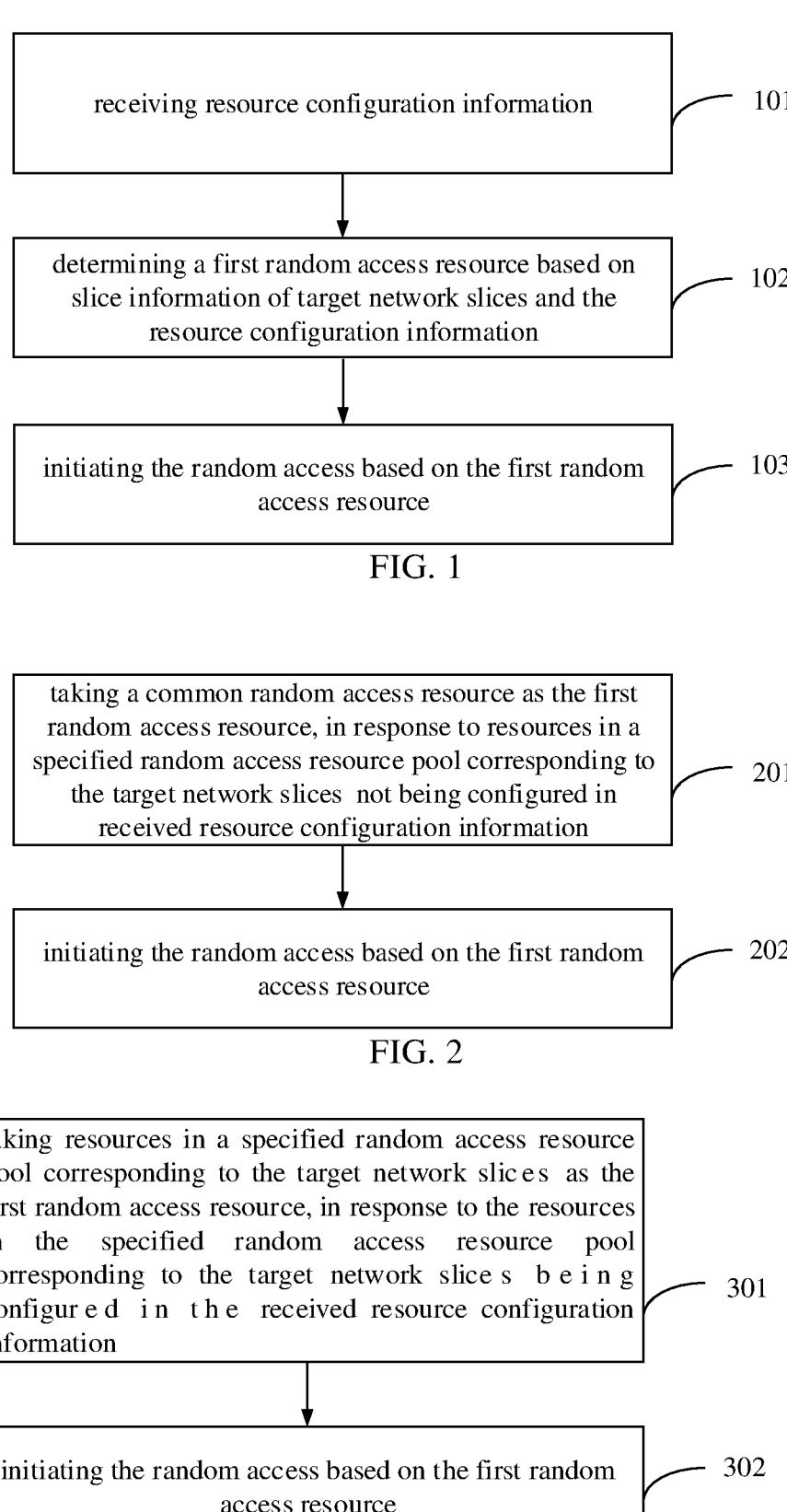

receiving resource configuration information — 101 determining a first random access resource based on slice information of target network slices and the resource configuration information — 102 initiating the random access based on the first random access resource — 103

FIG. 1 taking a common random access resource as the first random access resource, in response to resources in a specified random access resource pool corresponding to the target network slices not being configured in received resource configuration information — 201 initiating the random access based on the first random access resource — 202

FIG. 2 taking resources in a specified random access resource pool corresponding to the target network slices as the first random access resource, in response to the resources in the specified random access resource pool corresponding to the target network slices being configured in the received resource configuration information — 301 initiating the random access based on the first random access resource — 302

FIG. 3

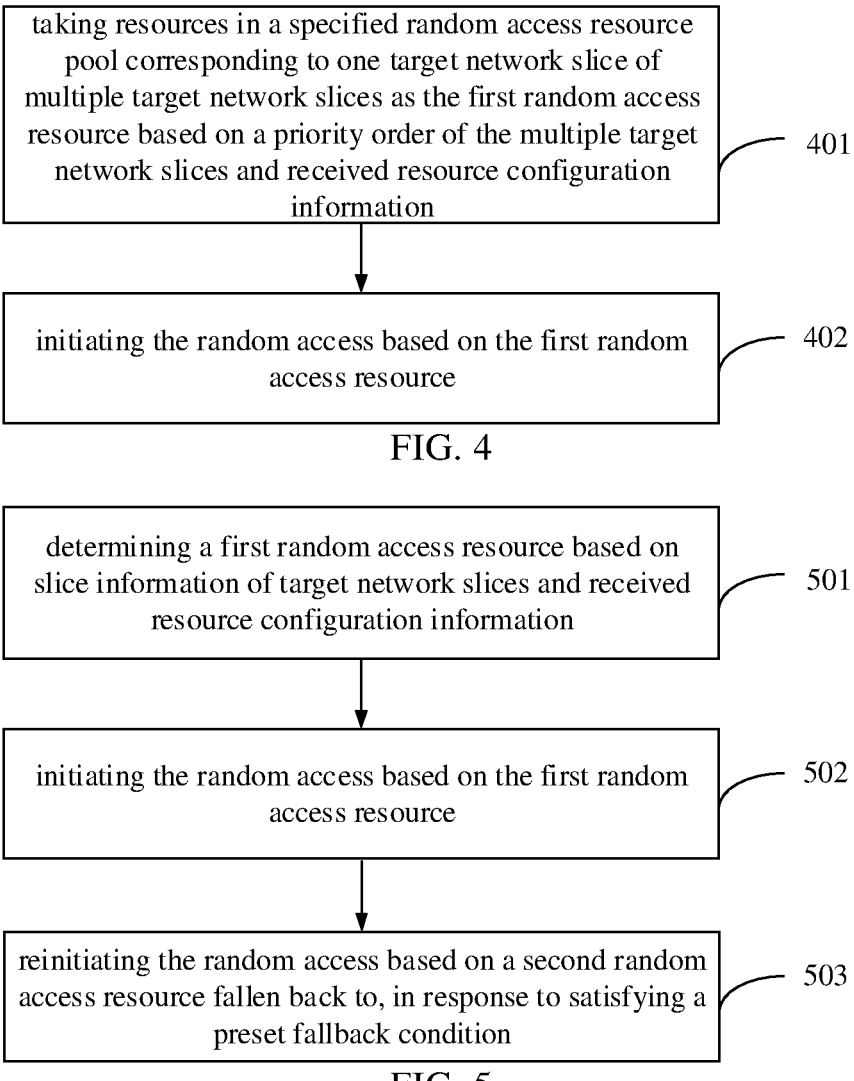

taking resources in a specified random access resource pool corresponding to one target network slice of multiple target network slices as the first random access resource based on a priority order of the multiple target network slices and received resource configuration information — 401 initiating the random access based on the first random access resource — 402

FIG. 4 determining a first random access resource based on slice information of target network slices and received resource configuration information — 501 initiating the random access based on the first random access resource — 502 reinitiating the random access based on a second random access resource fallen back to, in response to satisfying a preset fallback condition — 503

FIG. 5

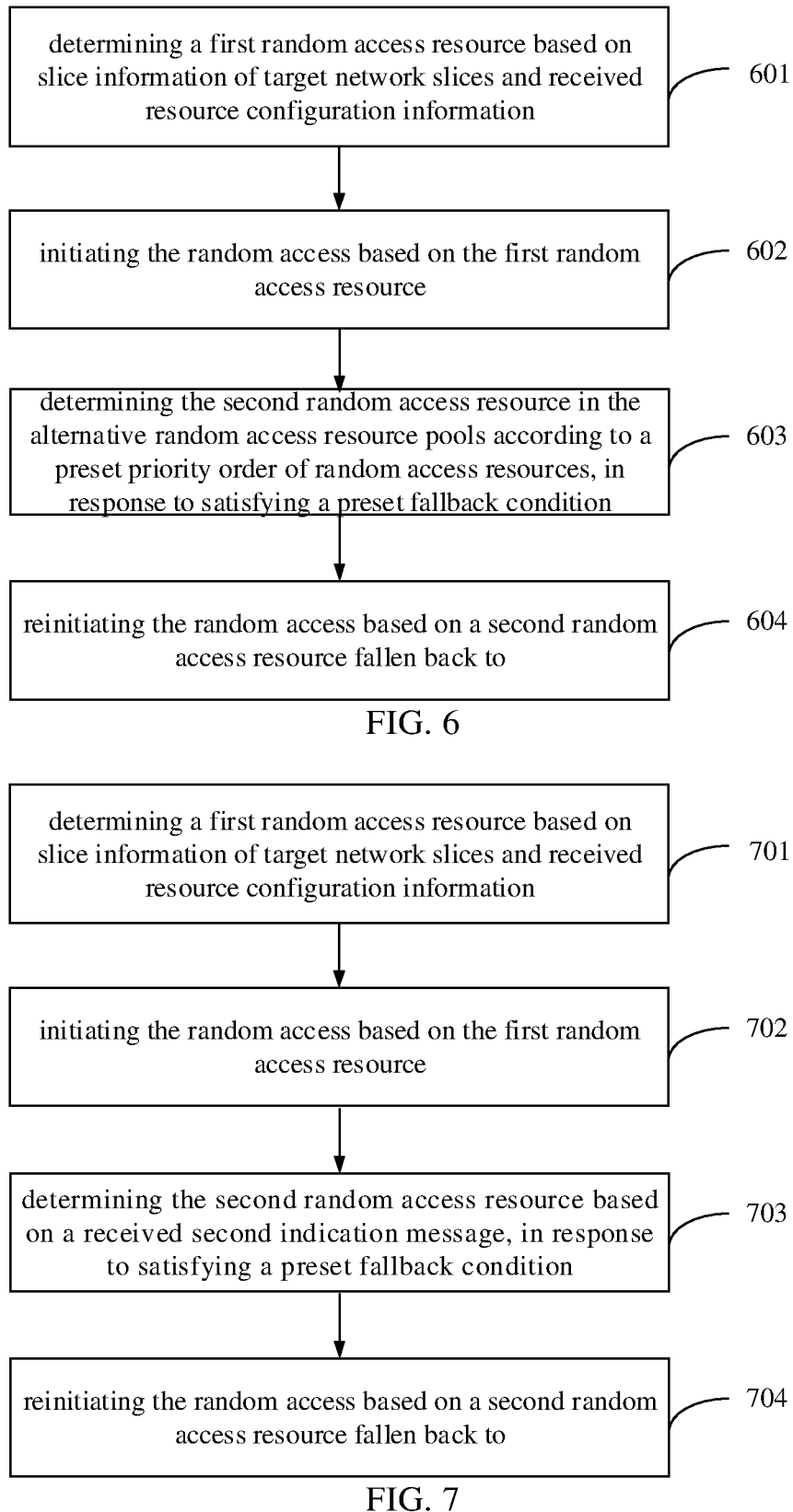

determining a first random access resource based on slice information of target network slices and received resource configuration information — 601 initiating the random access based on the first random access resource — 602 determining the second random access resource in the alternative random access resource pools according to a preset priority order of random access resources, in response to satisfying a preset fallback condition — 603 reinitiating the random access based on a second random access resource fallen back to — 604

FIG. 6 determining a first random access resource based on slice information of target network slices and received resource configuration information — 701 initiating the random access based on the first random access resource — 702 determining the second random access resource based on a received second indication message, in response to satisfying a preset fallback condition — 703 reinitiating the random access based on a second random access resource fallen back to — 704

FIG. 7 determining resource configuration information — 801 sending the resource configuration information — 802 sending a first indication message — 901 sending a second indication message — 1001 sending a third indication message — 1101 sending a fourth indication message — 1201 sending a random access resource fallback indication message — 1301

RANDOM ACCESS METHOD AND DEVICE, AND STORAGE MEDIUM

CROSS-REFERENCE TO RELATED APPLICATION

This application is a U.S. national phase application of International Patent Application No. PCT/CN2021/075607, filed on Feb. 5, 2021, the entire contents of which are incorporated herein by reference.

FIELD

The present disclosure relates to the field of communications, especially to a random access method, a random access apparatus, and a storage medium.

BACKGROUND

A network slice may provide a complete end-to-end virtual network for a specific user. Network slices of a $5^{th}$ generation mobile network (5G) may provide differentiated services for users with different service requirements by dividing network resources into multiple network slices. The different service requirements include, but are not limited to, delay, reliability, capacity, isolation and other functions. The operator network will not only serve an information consumption service characterized by a best effort transmission as a communication requirement, but also satisfy a production control service with a deterministic transmission as a communication requirement, allocating logically or physically isolated network resources for services with disparate communication requirements.

One network slice may be composed of a radio access network (RAN) and a core network (CN). The implementation of the network slice depends on a principle where a traffic of different slices is processed by different protocol data unit (PDU) sessions. The network may implement different network slices by scheduling and providing different L1 stratum/L2 stratum configurations.

A random access process includes a contention random access and a non-contention random access. In the contention random access, a random access request resource (i.e., a resource used by MSG1) is not dedicated to one user equipment (UE). That is, multiple users may initiate random access requests on a same time-frequency domain resource, and a relationship between a base station and a UE needs to be established through a contention resolution process. In the non-contention random access, the random access request resource is allocated by a base station to a specified UE, and the base station may uniquely identify the UE as long as it identifies a dedicated random access resource of the UE.

Generally, except for a positioning process in a radio resource control (RRC) connection state, other events that trigger random access may adopt a contention-based access mode. However, a UE using a certain network slice service may collide with other UEs in the random access process.

SUMMARY

According to a first aspect of the present disclosure, there is provided a random access method. The method is applied to a user equipment (UE) and includes receiving resource configuration information, in which the resource configuration information is configured to configure resources in a specified random access resource pool corresponding to at least one network slice, determining a first random access resource based on slice information of target network slices and the resource configuration information, in which the target network slices are network slices for the UE to initiate a random access, and initiating the random access based on the first random access resource.

According to a second aspect of the present disclosure, there is provided a random access method. The method is applied to a base station and includes sending resource configuration information, in which the resource configuration information is configured to configure resources in a specified random access resource pool corresponding to at least one network slice.

According to a third aspect of the present disclosure, there is provided a random access device. The random access device includes a processor, and a memory for storing instructions executable by the processor, in which the processor is configured to execute the random access method described in the first aspect.

It is to be understood that the foregoing general description and the following detailed description are exemplary and explanatory merely and are not restrictive of the present disclosure.

BRIEF DESCRIPTION OF THE DRAWINGS

The accompanying drawings herein, which are incorporated in and constitute a part of this specification, illustrate embodiments consistent with the present disclosure and, together with the description, serve to explain the principles of the present disclosure.

FIG. 1 is a flow chart showing a random access method according to an illustrative embodiment.

FIG. 2 is a flow chart showing another random access method according to an illustrative embodiment.

FIG. 3 is a flow chart showing another random access method according to an illustrative embodiment.

FIG. 4 is a flow chart showing another random access method according to an illustrative embodiment.

FIG. 5 is a flow chart showing another random access method according to an illustrative embodiment.

FIG. 6 is a flow chart showing another random access method according to an illustrative embodiment.

FIG. 7 is a flow chart showing another random access method according to an illustrative embodiment.

DETAILED DESCRIPTION

Figures 8, 9, 10, 11, 12, 13:
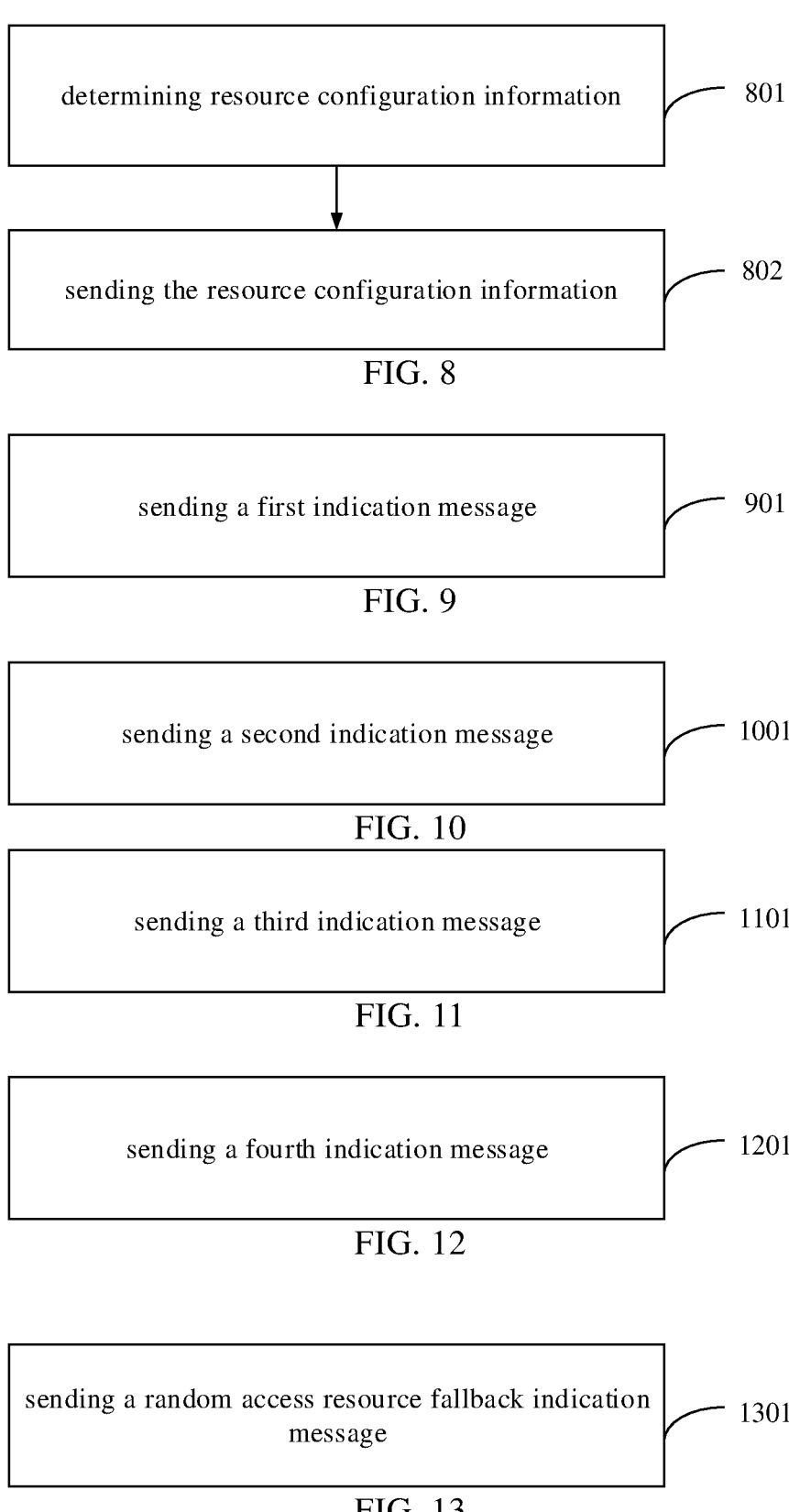
FIG. 8 is a flow chart showing another random access method according to an illustrative embodiment.
FIG. 9 is a flow chart showing another random access method according to an illustrative embodiment.
FIG. 10 is a flow chart showing another random access method according to an illustrative embodiment.
FIG. 11 is a flow chart showing another random access method according to an illustrative embodiment.
FIG. 12 is a flow chart showing another random access method according to an illustrative embodiment.
FIG. 13 is a flow chart showing another random access method according to an illustrative embodiment.

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the present disclosure. Instead, they are merely examples of apparatuses and methods consistent with aspects related to the disclosure as recited in the appended claims.

Terms used herein in the present disclosure are only for the purpose of describing specific embodiments, but should not be construed to limit the present disclosure. As used in the present disclosure and the appended claims, "a/an", "said" and "the" in singular forms are intended to include plural forms, unless clearly indicated in the context otherwise. It should also be understood that, the term "and/or" used herein represents and contains any or all possible combinations of one or more associated listed items.

It is to be understood that, although terms such as "first," "second" and "third" may be used in the present disclosure for describing various information, these information should not be limited by these terms. These terms are only used for distinguishing information of the same type from each other. For example, first information may also be referred to as second information, and similarly, the second information may also be referred to as the first information, without departing from the scope of the present disclosure. As used herein, the term "if" may be construed to mean "when" or "upon" or "in response to determining" depending on the context.

In an embodiment of the present disclosure, a user equipment (UE) using a certain slice service may initiate random access based on a common random access channel (RACH) resource. Considering that multiple UEs adopt the common RACH resource to initiate random access, it is likely to lead to network congestion.

In order to solve this technical problem, the present disclosure provides a random access solution, which may configure a separate specified RACH resource pool corresponding to a network slice for each network slice or each network slice group.

The UE may initiate random access based on resources in a specified random access resource pool corresponding to the network slice configured for the random access. For example, a network slice 1 corresponds to a specified random access resource pool 1, a network slice 2 corresponds to a specified random access resource pool 2, and so on. The network slice configured for the UE to initiate the random access is the network slice 2, and the UE initiates random access based on resources in the specified random access resource pool 2.

In the above-mentioned embodiment, different random access resource pools may be provided for different network slices. That is, the isolation of random access resources is provided for the network slices, so that a UE using a network slice service may perform access based on independent slice-specific random access resources, thus reducing interference.

Of course, in an actual random access process, the random access resources available to different network slices are limited. Therefore, different UEs may collide even if they perform access on a specified random access resource corresponding to the network slice. To solve this problem, the present disclosure also provides another random access solution.

The random access solution provided in the present disclosure will first be described below from a user equipment (UE) side.

An embodiment of the present disclosure provides a random access method, which may be applied to a user equipment (UE). Referring to FIG. 1, FIG. 1 is a flow chart showing a random access method according to an embodiment. The method may include steps as follows.

In step 101, resource configuration information is received.

In an embodiment of the present disclosure, the resource configuration information is configured to configure resources in a specified random access resource pool corresponding to at least one network slice. A network side may configure resources in a separate specified random access resource pool corresponding to different network slices through the resource configuration information.

In step 102, a first random access resource is determined based on slice information of target network slices and the resource configuration information.

In an embodiment of the present disclosure, the target network slices are network slices for the UE to initiate a random access. That is, the target network slices may be network slices for which the UE is triggered to initiate the random access.

In step 103, random access is initiated based on the first random access resource.

In the above-mentioned embodiment, the first random access resource for initiating the random access may be determined based on the slice information of the target network slices configured for the UE to initiate the random access and the resource configuration information sent by the network side. Therefore, the possibility of a collision between a UE using a certain slice service and other UEs in the process of random access is reduced, the success rate of random access of the UE is improved, so that the UE may quickly complete the random access and obtains the desired slice service.

In some optional embodiments, referring to FIG. 2, FIG. 2 is a flow chart showing a random access method according to an embodiment. The method may include steps as follows.

In step 201, a common random access resource is taken as the first random access resource, in response to resources in a specified random access resource pool corresponding to the target network slices not being configured in received resource configuration information.

In an embodiment of the present disclosure, the resource configuration information is configured to configure resources in a specified random access resource pool corresponding to at least one network slice. The target network slices are network slice for the UE to initiate a random access. That is, the target network slices may be network slices for which the UE is triggered to initiate the random access. In case that the resources in the specified random access resource pool of the target network slices configured for the UE to initiate the random access are not configured in the resource configuration information, the UE may take the common random access resource as the first random access resource.

In step 202, random access is initiated based on the first random access resource.

In the above-mentioned embodiment, in case that the resources in the specified random access resource pool corresponding to the target network slices are not configured in the resource configuration information issued by the network side, the UE may select the common random access resource for the random access.

In some optional embodiments, referring to FIG. 3, FIG. 3 is a flow chart showing a random access method according to an embodiment. The method may include steps as follows.

In step 301, resources in a specified random access resource pool corresponding to the target network slices are taken as the first random access resource, in response to the resources in the specified random access resource pool corresponding to the target network slices being configured in received resource configuration information.

In an embodiment of the present disclosure, the resource configuration information is configured to configure resources in a specified random access resource pool corresponding to at least one network slice. The target network slices are network slices for the UE to initiate a random access. That is, the target network slices may be network slices for which the UE is triggered to initiate the random access. In case that the resources in the specified random access resource pool of the target network slices configured for the UE to initiate the random access are configured in the resource configuration information, the UE may take the resources in the specified random access resource pool corresponding to the target network slices as the first random access resource.

In step 302, random access is initiated based on the first random access resource.

In the above-mentioned embodiment, the UE initiates the random access based on the resources in the specified random access resource pool corresponding to the target network slices, thus reducing the possibility of a collision between the UE using the slice service and other UEs in the process of random access, and improving the success rate of random access of the UE, so that the UE may quickly complete the random access and obtain the desired slice service.

In some optional embodiments, for an initial random access process of the UE, the UE may obtain the resource configuration information through a system message. Further, the UE may determine the first random access resource for initiating the random access based on the slice information of the target network slices and the resource configuration information. The target network slices are network slices for the UE to initiate the random access.

In the above-mentioned embodiment, for the initial random access process of the UE, the UE may determine the resource configuration information through the system message carrying the resource configuration information, and then determine the first random access resource for initiating the random access, which improves the success rate of random access and is high in availability.

In some optional embodiments, for the random access process triggered by a physical downlink control channel (PDCCH) instruction, the UE may receive the PDCCH instruction carrying the resource configuration information. Further, the UE may determine the first random access resource for initiating the random access based on the slice information of the target network slices and the resource configuration information.

In the above-mentioned embodiment, in the random access process triggered by the PDCCH instruction, the UE may determine the resource configuration information through the PDCCH instruction carrying the resource configuration information, and then determine the first random access resource for initiating the random access, which improves the success rate of the random access and is high in availability.

In some optional embodiments, the UE has established a radio resource control (RRC) connection with a base station. That is, in case that an RRC message issued by the base station triggers the UE to initiate the random access, the UE may receive the RRC message carrying the resource configuration information. Further, the UE may determine the first random access resource for initiating the random access based on the slice information of the target network slices and the resource configuration information.

In the above-mentioned embodiment, in case that the UE has established the RRC connection with the network side, the UE may determine the resource configuration information through the RRC message carrying the resource configuration information, and then determine the first random access resource for initiating the random access, which improves the success rate of random access and is high in availability.

In some optional embodiments, referring to FIG. 4, FIG. 4 is a flow chart showing a random access method according to an embodiment. The method may include steps as follows.

In step 401, resources in a specified random access resource pool corresponding to one target network slice of multiple target network slices is taken as the first random access resource based on a priority order of the multiple target network slices and received resource configuration information.

In an embodiment of the present disclosure, the resource configuration information is configured to configure resources in a specified random access resource pool corresponding to at least one network slice. The target network slices are network slices for the UE to initiate a random access. The number of the target network slices for the UE to initiate the random access may be multiple.

According to the priority order of the multiple target network slices and the received resource configuration information, the UE may take the resources in the specified random access resource pool corresponding to one target network slice of multiple target network slices as the first random access resource in the order of priority from high to low.

For example, a priority of a target network slice 1 is higher than a priority of a target network slice 2, and the priority of the target network slice 2 is higher than a priority of a target network slice 3, then the UE preferentially takes the resources in the specified random access resource pool corresponding to the target network slice 1 as the first random access resource.

In case that the resources in the specified random access resource pool corresponding to the target network slice 1 are not configured in the resource configuration information, the UE takes the resources in the specified random access resource pool corresponding to the target network slice 2 as the first random access resource.

Of course, in case that the resources in the specified random access resource pool corresponding to the target network slice 2 are not configured in the resource configuration information, the UE takes the resources in the specified random access resource pool corresponding to the target network slice 3 as the first random access resource. The rest can be done in the same manner, until the first random access resource is determined.

In step 402, random access is initiated based on the first random access resource.

In the above-mentioned embodiment, the UE may determine the first random access resource based on the priority order of the multiple target network slices and the resource configuration information, which improves the success rate of random access and is high in availability.

In some optional embodiments, in case that the number of the target network slices for the UE to initiate the random access is multiple, the priority order of the multiple target network slices may be determined in any one of the following ways, but not limited to, the following ways.

In an implementation, the priority order of the multiple target network slices may be determined by the UE itself.

Optionally, the priority order of the multiple target network slices may be determined by the UE based on the service priority order.

For example, a preset service priority order is that a priority of an application 1 is higher than a priority of an application 2. In case that the target network slice 1 provides the UE with a service corresponding to the application 1 and the target network slice 2 provides the UE with a service corresponding to the application 2, the UE may determine that the priority of the target network slice 1 is higher than the priority of the target network slice 2.

The above is merely an illustrative description. In practical applications, the UE may also adopt other ways to determine the priority order of the multiple target network slices. In another implementation, the priority order of the multiple target network slices may be configured and issued by the network side.

Optionally, the UE may determine the priority order of the multiple target network slices based on a received first indication message issued by the network side. The first indication message is configured to configure the priority order of the multiple target network slices.

For example, in case that the first indication message is configured with a priority order of a network slice 1, a network slice 2 and a network slice 3 decreasing sequentially, the UE may determine that a priority order of the network slice 1 is greater than a priority order of the network slice 2, and the priority order of network slice 2 is greater than a priority order of the network slice 3.

In the above-mentioned embodiment, the priority order of the multiple target network slices may be determined by the UE itself, or the priority order of the multiple network slices may be configured and issued by the network side, which is easy to implement and high in availability.

In some optional embodiments, referring to FIG. 5, FIG. 5 is a flow chart showing a random access method according to an embodiment. The method may include steps as follows.

In step 501, a first random access resource is determined based on slice information of target network slices and received resource configuration information.

In an embodiment of the present disclosure, the target network slices are network slices for the UE to initiate a random access. That is, the target network slices may be network slices for which the UE is triggered to initiate random access. The resource configuration information is configured to configure resources in a specified random access resource pool corresponding to at least one network slice.

In step 502, random access is initiated based on the first random access resource.

In step 503, the random access is reinitiated based on a second random access resource fallen back to, in response to satisfying a preset fallback condition.

In an embodiment of the present disclosure, the second random access resource may be an item in an alternative random access resource pool. The alternative random access resource pool includes, but is not limited to, at least one of resources in a specified random access resource pool corresponding to other network slices, other random access resources corresponding to the target network slices, or common random access resources.

The resources in the specified random access resource pool corresponding to the other network slices refer to the resources in the specified random access resource pool corresponding to the other network slices other than the target network slices. For example, the target network slice is the network slice 2, and the resources in the specified random access resource pool corresponding to the other network slices may include resources in the specified random access resource pool corresponding to the network slice 1, the network slice 3, a network slice 4, and so on, respectively.

The other random access resources corresponding to the target network slices may include random access resources corresponding to other resource configurations other than a first resource configuration corresponding to the target network slices. The UE initiates the random access based on the first resource configuration. For example, the target network slices correspond to a resource configuration 1 and a resource configuration 2. In case that the UE initiates the random access based on the resource configuration 1, the other random access resources corresponding to the target network slices may refer to random access resources corresponding to the resource configuration 2.

The common random access resources include, but are not limited to, random access resources that may be used by multiple UEs. In an embodiment of the present disclosure, the multiple UEs include, but are not limited to, all types of UEs. Or, the multiple UEs may include, but are not limited to, specified types of UEs. The specified types of UEs may include, but are not limited to, long term evolution (LTE) terminals, machine type communication (MTC) devices, narrow band Internet of Things (NB-IOT) devices, and the like, which are not limited in the present disclosure.

In an embodiment of the present disclosure, the second random access resource may also be a random access resource configured by the network side. Optionally, the second random access resource may be a random access resource which is determined based on the received second indication message issued by the network side.

The random access resource indicated by a second indication message may be any item in the above-mentioned alternative random access resource pools. Or, the random access resource indicated by a second indication message may be other random access resources different from any item in the above-mentioned alternative random access resource pools.

In an implementation, the second random access resource may adopt, but is not limited to, one random access resource configured and indicated by the network side for a UE needing to perform the resource fallback according to the number of UEs initiating the random access on random access resources of different slices.

For example, in case that the UE satisfies the preset fallback condition and needs to fall back to the second random access resource, and the network side determines that the number of UEs initiating the random access on the random access resource corresponding to a certain network slice is small, the network side may directly take the random access resource corresponding to the network slice as the second random access resource, and then send it to the UE, so that the UE may fall back to the random access resource corresponding to the network slice to reinitiate the random access.

In the above-mentioned embodiment, in a case of multiple collisions on the first random access resource, the UE may perform the resource fallback and reinitiate the random access based on the second random access resource fallen back to. This avoids random access failure caused by the fact that the UE always initiates the random access on the first random access resource until the maximum number of the random accesses is reached, thus improving the success rate of the random access of the UE.

In some optional embodiments, in case that the number of the resources in the specified random access resource pool corresponding to the other network slices is multiple, the UE may determine a priority order of the multiple resources in the specified random access resource pool corresponding to the other network slices in the following ways, but not limited to, the following ways.

In an implementation, the priority order of the multiple resources in the specified random access resource pool corresponding to the other network slices may be determined by the UE itself.

Optionally, the UE may determine the priority order of the multiple resources in the specified random access resource pool corresponding to the other network slices in a preset way. The preset way includes, but is not limited to, a randomly selected way.

In another implementation, the priority order of the multiple resources in the specified random access resource pool corresponding to the other network slices may be configured and issued by the network side.

The UE may determine the priority order of the multiple resources in the specified random access resource pool corresponding to the other network slices based on a received third indication message. A third indication message is configured to configure the priority order of the multiple resources in the specified random access resource pool corresponding to the other network slices.

In the above-mentioned embodiment, the priority order of the multiple resources in the specified random access resource pool corresponding to the other network slices may be determined by the UE itself, or the priority order of the multiple resources in the specified random access resource pool corresponding to the other network slices may be configured and issued by the network side, which is easy to implement and high in availability.

In some optional embodiments, in case that the number of the other random access resources corresponding to the target network slices is multiple, a priority order of the multiple other random access resources corresponding to the target network slices may be determined in any one of the following ways, but not limited to, the following ways.

In an implementation, the priority order of the multiple other random access resources corresponding to the target network slices may be determined by the UE itself.

Optionally, the priority order of the multiple other random access resources corresponding to the target network slices may be determined by the UE in a preset way. The preset way includes, but is not limited to, a randomly selected way.

In another implementation, the priority order of the multiple other random access resources corresponding to the target network slices may be configured and issued by the network side.

Optionally, the UE may determine the priority order of the multiple other random access resources corresponding to the target network slices based on a received fourth indication message issued by the network side. The fourth indication message is configured to configure the priority order of the multiple other random access resources corresponding to the target network slices.

In the above-mentioned embodiment, the priority order of the multiple other random access resources corresponding to the target network slices may be determined by the UE itself, or the priority order of the multiple other random access resources corresponding to the target network slices may be configured and issued by the network side, which is easy to implement and high in availability.

In some optional embodiments, referring to FIG. 6, FIG. 6 is a flow chart showing a random access method according to an embodiment. The method may include steps as follows.

In step 601, a first random access resource is determined based on slice information of target network slices and received resource configuration information.

The target network slices are network slices for the UE to initiate a random access. That is, the target network slices may be network slices for which the UE is triggered to initiate the random access. The resource configuration information is configured to configure resources in a specified random access resource pool corresponding to at least one network slice.

In step 602, random access is initiated based on the first random access resource.

In step 603, the second random access resource is determined in the alternative random access resource pools according to a preset priority order of random access resources, in response to satisfying a preset fallback condition.

In an embodiment of the present disclosure, a preset priority order from high to low includes, but is not limited to, other random access resources corresponding to the target network slices, resources in a specified random access resource pool corresponding to other network slices, and common random access resources.

The above is merely an illustrative description. In practical applications, the preset priority order may also adopt other priority orders.

The UE may select an item in the alternative resource pools as the second random access resource in the preset priority order from high to low.

For example, the preset priority order from high to low is a slice 1, a slice 2, and a slice 3.

The resource configuration information includes a random access resource configuration 0 and a random access resource configuration 1 corresponding to the slice 1, a random access resource configuration 2 corresponding to the slice 2, a random access resource configuration 3 corresponding to the slice 3, and a common random access resource configuration.

In case that the slice 1 is configured for the UE to initiate random access, namely, the slice 1 is taken as a target network slice, UE preferentially initiates the random access based on random access resources corresponding to the configuration 0, and sequentially selects random access resources respectively corresponding to the random access resource configuration 1, the random access resource configuration 2, the random access resource configuration 3 and the common random access resource configuration to initiate the random access according to the above preset priority order in response to satisfying a preset fallback condition.

In step 604, the random access is reinitiated based on the second random access resource fallen back to.

In the above-mentioned embodiment, in a case of multiple collisions on the first random access resource, the UE may perform the resource fallback and reinitiate the random access based on the second random access resource determined by the UE. This avoids random access failure caused by the fact that the UE always initiates the random access on the first random access resource until the maximum number of the random accesses is reached, thus improving the success rate of the random access of the UE.

In some optional embodiments, referring to FIG. 7, FIG. 7 is a flow chart showing a random access method according to an embodiment. The method may include steps as follows.

In step 701, a first random access resource is determined based on slice information of target network slices and received resource configuration information.

The target network slices are network slices for the UE to initiate a random access. That is, the target network slices may be network slices for which the UE is triggered to initiate the random access. The resource configuration information is configured to configure resources in a specified random access resource pool corresponding to at least one network slice.

In step 702, random access is initiated based on the first random access resource.

In step 703, the second random access resource is determined based on a received second indication message, in response to satisfying a preset fallback condition.

In an implementation, a random access resource indicated by the second indication message may be an item in the above-mentioned alternative random access resource pools. The UE determines the item in the alternative random access resource pools as the second random access resource based on the second indication message.

In another implementation, the random access resource indicated by the second indication message may be an item in the alternative random access resource pools, or may be a random access resource different from any item in the alternative random access resource pools. This is not limited in the present disclosure.

In step 704, the random access is reinitiated based on the second random access resource fallen back to.

In the above-mentioned embodiment, in a case of multiple collisions on the first random access resource, the UE may perform the resource fallback, determine the second random access resource based on the indication of the network side, and reinitiate the random access based on the second random access resource. This avoids random access failure caused by the fact that the UE always initiates the random access on the first random access resource until the maximum number of the random accesses is reached, thus improving the success rate of the random access of the UE.

In an implementation, the second indication message may be configured to implicitly indicate the second random access resource.

Optionally, the second indication message may be, but is not limited to be, configured to indicate a resource selection index. The resource selection index may be associated with an item in the alternative random access resource pool or other random access resources different from the alternative random access resource pool.

For example, a resource selection index "01" corresponds to the other random access resources corresponding to the target network slices, a resource selection index "10" corresponds to the resources in the specified random access resource pool corresponding to the other network slices, and a resource selection index "11" corresponds to the common random access resources. In case that the resource selection index indicated by the third indication message received by the UE is "11", the UE may take the common random access resources as the second random access resource.

For another example, in case that a resource selection index "00" corresponds to the third random access resource of a certain network slice, the UE may take the third random access resource of the network slice as the second random access resource for resource fallback according to the resource selection index. The third random access resource does not belong to any item in the alternative random access resource pool.

In another implementation, the second indication message may be configured to explicitly indicate the second random access resource.

Optionally, the second indication message may be, but is not limited to be, directly configured to configure the second random access resource.

For example, in case that the second indication message is configured to configure the random access resource configuration 1, the UE directly takes the random access resource corresponding to the random access resource configuration 1 as the second random access resource.

In the above-mentioned embodiment, the second indication message may be configured to indicate the second random access resource implicitly or explicitly. According to the second indication message issued by the network side, the UE may quickly determine a second random access resource to be fallen back to in case that resource fallback occurs. This avoids random access failure caused by the fact that the UE always initiates the random access on the first random access resource until the maximum number of the random accesses is reached, thus improving the success rate of the random access of the UE.

In some optional embodiments, the UE may receive a random access response (RAR) message carrying the second indication message issued by the network side in the process of the random access. Therefore, the second random access resource is determined based on the second indication message.

Optionally, the UE may receive an RRC message carrying the second indication message sent by the network side in a case that the UE establishes an RRC connection with the base station side. In an embodiment of the present disclosure, the RRC message may be an RRC message carrying the second indication message which is separately issued to the UE.

In the above-mentioned embodiment, the UE may determine the third indication message based on a received RAR message or RRC message, and then determine the second random access resource for resource fallback according to the second indication message, thus realizing the purpose of determining the second random access resource for fallback based on the indication of the network side, and having high availability.

In some optional embodiments, the UE initiates the random access based on the first random access resource, and may fall back to the second random access resource to reinitiate the random access in response to satisfying the preset fallback condition.

In an implementation, the preset fallback condition may include the number of failures of initiating the random access based on the first random access resource reaching a first fallback number threshold. Here, the first fallback number threshold may be configured to indicate the cumulative number of failures allowed to initiate the random access based on the first random access resource before falling back to the second random access resource for the random access.

For example, in case that the first fallback number threshold is N1, the number of times that the UE fails to initiate the random access based on the first random access resource reaches N1, and the UE determines that the preset fallback condition is satisfied, and may fall back to the second random access resource to reinitiate the random access.

In another implementation, the preset fallback condition may include a first fallback timer expiring. The first fallback timer is configured to indicate a cumulative duration allowed to initiate the random access based on the first random access resource before falling back to the second random access resource for the random access.

For example, in case that a duration of the first fallback timer is t1, the cumulative duration of the random access initiated by the UE based on the first random access resource reaches t1, and the UE determines that the preset fallback condition is satisfied, and may fall back to the second random access resource to reinitiate the random access.

In another implementation, the preset fallback condition may include receiving a random access resource fallback indication message corresponding to the target network slices.

In an embodiment of the present disclosure, the UE may determine that the preset fallback condition is satisfied based on the random access resource fallback indication message corresponding to the target network slices issued by the network side, so as to fall back to the second random access resource to reinitiate the random access.

It is to be understood that the preset fallback condition may include any one or a combination of the above, and other possible preset fallback conditions is to be within the protection scope of the present disclosure.

In the above-mentioned embodiment, the UE may perform the resource fallback on the basis of satisfying the preset fallback condition, and reinitiate the random access on the second random access resource fallen back to, thus improving the success rate of the random access.

In some optional embodiments, in addition to configuring the resources in the specified random access resource pool corresponding to the at least one network slice, the resource configuration information may be configured to configure at least one of the first fallback number threshold and the first fallback timer.

In the above-mentioned embodiment, the network side may directly configure at least one of the first fallback number threshold and the first fallback timer through the resource configuration information, which facilitates the UE to complete the random access more quickly and improves the success rate of the random access.

In an implementation, the network side may send a random access resource fallback indication message through an RAR message. After receiving the RAR message, the UE may fall back to the second random access resource to reinitiate the random access based on the random access resource fallback indication message.

In another implementation, the network side may send a random access resource fallback indication message through an RRC message. After receiving the RRC message, the UE may fall back to the second random access resource to reinitiate the random access based on the random access resource fallback indication message.

In the above-mentioned embodiment, the UE may perform the resource fallback based on the RAR or RRC message carrying the random access resource fallback indication message issued by the network side. This avoids random access failure caused by the fact that the UE always initiates the random access on the first random access resource until the maximum number of the random accesses is reached, thus improving the success rate of the random access of the UE.

In some optional embodiments, the random access fallback indication message may be configured to configure at least one of a second fallback number threshold and a second fallback timer. The second fallback number threshold is configured to indicate the number of failures allowed to initiate the random access based on the second random access resource before falling back from the second random access resource to the first random access resource to initiate the random access. The second fallback timer is configured to indicate a cumulative duration allowed to initiate the random access based on the second random access resource before falling back from the second random access resource to the first random access resource to initiate the random access.

For example, in case that the second fallback number threshold is N2, the number of times that the UE falls back from the first random access resource to the second random access resource to reinitiate the random access reaches N2, and the current total number of the random accesses currently initiated does not reach a preamble TransMax (maximum number of random accesses), the UE may fall back to the first random access resource for initiating the random access again.

In case that the first random access resource is the resources in the specified random access resource pool corresponding to the target network slices, the UE may preferentially fall back to the resource in the specified random access resource pool corresponding to the target network slices. Until the preset fallback condition is satisfied again, the UE performs resource fallback again. Or, the UE falls back to the resources in the specified random access resource pool corresponding to the target network slices, the total number of initiating the random access reaches the maximum number of the random accesses, and the UE may report a random access failure message to a higher stratum.

For another example, the UE may fall back to the first random access resource to reinitiate the random access, in case that a timing duration of the second fallback timer is t2, a cumulative duration for the UE to fall back from the first random access resource to the second random access resource for initiating the random access reaches t2, and the total number of the random accesses currently initiated does not reach the maximum number of the random accesses. That is, UE may preferentially select the resources in the specified random access resource pool corresponding to the target network slices to reinitiate the random access. Until the preset fallback condition is satisfied again, the UE performs resource fallback again. Or, the UE falls back to the resources in the specified random access resource pool corresponding to the target network slices, the total number of initiating the random access reaches the maximum number of the random accesses, and the UE may report a random access failure message to the higher stratum.

In the above-mentioned embodiment, it is possible to avoid the problem that the UE always initiates the random access on the second random access resource after falling back to the second access resource until the maximum number of the random accesses is reached, which also leads to random access failure. After at least one collision occurs on the second random access resource, the UE may fall back to the first random access resource to initiate the random access, thus improving the success rate of the random access of the UE.

In some optional embodiments, the second fallback number threshold and the second fallback timer are not configured in the random access resource fallback indication message. The UE may fall back to the first random access resource to reinitiate the random access, in case that the total number of the random accesses currently initiated does not reach the maximum number of the random accesses after the UE falls back from the first random access resource to the second random access resource to perform one random access failure. The first random access resource may include the resources in the specified random access resource pool corresponding to the target network slices.

In the above-mentioned embodiment, it is possible to avoid the problem that the UE always initiates the random access on the second random access resource after falling back to the second access resource until the maximum number of the random accesses is reached, which also leads to random access failure. After one collision occurs on the second random access resource, the UE may fall back to the first random access resource to initiate the random access, thus improving the success rate of the random access of the UE.

In some optional embodiments, the random access resource fallback indication message may carry a fallback-Factor (fallback alternative factor). Optionally, the fallback-Factor may be a fallback probability value, thus enabling the UE to implement a probability fallback.

In the embodiment of the present disclosure, the UE may generate a random number after receiving the random access resource fallback indication message, so as to determine whether it is necessary to perform the resource fallback according to a generated random number and the fallback probability value carried in the random access resource fallback indication message. In case that it is determined that resource fallback is needed, the random access may be reinitiated based on the second random access resource fallen back to.

In an implementation, the UE may randomly generate, but not limited to, a random number satisfying a uniform distribution. The random number may be, but is not limited to be, in a range of [0,1]. In case that the generated random number is less than the fallback probability value, the UE performs the random access resource fallback. In case that the generated random number is greater than or equal to the fallback probability value, the UE may not perform the random access resource fallback.

In another implementation, the UE may generate random numbers satisfying other distributions. In case that a generated random number is greater than the fallback probability value, the UE performs the random access resource fallback. In case that the generated random number is less than or equal to the fallback probability value, the UE may not perform the resource fallback.

In the above-mentioned embodiment, the UE may determine whether to perform the resource fallback based on the fallback probability value carried in the random access resource fallback indication message and the generated random number, and then reinitiate the random access based on the second random access resource fallen back to. This avoids random access failure caused by the fact that the UE always initiates the random access on the first random access resource until the maximum number of the random accesses is reached, thus realizing the purpose of probability fallback for the UE and improving the success rate of the random access of the UE.

In some optional embodiments, the resource configuration information carries a fallback probability value.

In an embodiment of the present disclosure, the UE may generate a random number, so as to determine whether it is necessary to perform the resource fallback according to a generated random number and the fallback probability value carried in the resource configuration information. In case that it is determined that resource fallback is needed, the random access may be reinitiated based on the second random access resource fallen back to.

In an implementation, the UE may randomly generate, but not limited to, a random number satisfying a uniform distribution. The random number may be, but is not limited to be, in a range of [0,1]. In case that the generated random number is less than the fallback probability value, the UE performs the random access resource fallback. In case that the generated random number is greater than or equal to the fallback probability value, the UE may not perform the random access resource fallback.

In another implementation, the UE may generate random numbers satisfying other distributions. In case that a generated random number is greater than the fallback probability value, the UE performs the random access resource fallback. In case that the generated random number is less than or equal to the fallback probability value, the UE may not perform the resource fallback.

In the above-mentioned embodiment, the UE may determine whether to perform the resource fallback based on the fallback probability value carried in the resource configuration information and the generated random number, and then reinitiate the random access based on the second random access resource fallen back to. This avoids random access failure caused by the fact that the UE always initiates the random access on the first random access resource until the maximum number of the random accesses is reached, thus realizing the purpose of probability fallback of the UE and improving the success rate of the random access of the UE.

In some optional embodiments, the UE may determine the slice information of the target network slices in any one of the following ways, but not limited to, the following ways.

In an implementation, the UE may acquire the slice information of the target network slices sent by a non-access stratum (NAS) to an access stratum (AS) in case that the NAS requests the AS to initiate an RRC connection.

In another implementation, for a random access triggered by paging on the network side, the UE may receive a paging message carrying the slice information of the target network slices issued by the network side.

In another implementation, for a random access process triggered by a PDCCH instruction, the UE may receive a PDCCH instruction carrying the slice information of the target network slices issued by the network side.

In another implementation, in case that a logical channel identifier is associated with slice information, the UE may determine that there is a logical channel with data to be transmitted, determine the slice information associated with the logical channel according to the channel identifier of the logical channel, and take the slice information as the slice information of the target network slices. Optionally, the association between the logical channel identifier and the slice information may include, but is not limited to, same or different slice information corresponding to different logical channel identifiers.

In an embodiment of the present disclosure, the slice information of the target network slices may include, but is not limited to, at least one of single-network slice selection assistance information (S-NSSAI), a slice service type (SST), a slice differentiator (SD) identifier, a slice index, or an operator defined access type.

In the above-mentioned embodiment, the UE may determine the slice information of the target network slices in different ways, and may subsequently determine the first random access resource for initiating the random access according to the slice information of the target network slices and the received resource configuration information. The possibility of a collision of the UE using the slice service in the process of the random access is reduced, and the success rate of random access of the UE is improved, so that the UE may quickly complete the random access and obtain the desired slice service.

The random access solution provided in the present disclosure will be described below from a base station side.

An embodiment of the present disclosure provides a random access method, which may be applied to a base station. Referring to FIG. 8, FIG. 8 is a flow chart showing a random access method according to an embodiment. The method may include steps as follows.

In step 801, resource configuration information is determined.

In an embodiment of the present disclosure, the resource configuration information is configured to configure resources in a specified random access resource pool corresponding to at least one network slice.

In step 802, the resource configuration information is sent.

In the above-mentioned embodiment, the base station may configure the resources in the specified random access resource pool corresponding to the at least one network slice through the resource configuration information, and then send them to a user equipment (UE) side, so that the UE may determine the first random access resource for initiating the random access. The possibility of a collision when the UE initiates a random access on a network slice is reduced, and the congestion of random access resources on the network slice is effectively relieved, thus improving the success rate of the UE initiating the random access, enabling the UE to quickly complete the random access and obtain a desired slice service.

In an embodiment of the present disclosure, the base station may send the resource configuration information in any one of the following ways, but not limited to, the following ways.

In an implementation, the base station may broadcast a system message carrying the resource configuration information, so that the UE may determine the resource configuration information according to the system message before initiating the random access.

In another implementation, the base station may send a physical downlink control channel (PDCCH) instruction, and the resource configuration information is carried in the PDCCH instruction.

In another implementation, the base station may send a radio resource control (RRC) message carrying the resource configuration information in case that establishing an RRC connection with the UE.

In the above-mentioned embodiment, the base station may send the resource configuration information to the UE in different ways, so that the UE may determine the first random access resource for initiating the random access, which is easy to implement and high in availability.

In some optional embodiments, referring to FIG. 9, FIG. 9 is a flow chart showing a random access method according to an embodiment. The method may include a step as follows.

In step 901, a first indication message is sent.

In an embodiment of the present disclosure, the first indication message may be configured to configure a priority order of multiple network slices. The base station may send the first indication message to the UE. In case that the number of the target network slices for the UE to initiate the random access is multiple, the UE side may determine the priority order of the multiple target network slices according to the first indication message, so as to select target network slices from the multiple target network slices, and initiate the random access based on resources in a specified random access resource pool corresponding to selected target network slices as the first random access resource.

In the above-mentioned embodiment, the base station may configure and send the priority order of the multiple network slices for the UE, so that the UE may determine the random access resource for initiating the random access, and the success rate of the random access of the UE is improved.

In some optional embodiments, referring to FIG. 10, FIG. 10 is a flow chart showing a random access method according to an embodiment. The method may include a step as follows.

In step 1001, a second indication message is sent.

In an embodiment of the present disclosure, the second indication message is configured for the UE to determine the second random access resource which is used when the resource fallback is performed.

The random access resource indicated by the second indication message may be any item in the above-mentioned alternative random access resource pools. Or, the random access resource indicated by the second indication message may be other random access resources different from any item in the above-mentioned alternative random access resource pools.

In the above-mentioned embodiment, the base station side may send the second indication message, so as to configure the second random access resource for resource fallback for the UE. This avoids random access failure caused by the fact that the UE always initiates the random access on the first random access resource until the maximum number of the random accesses is reached, thus improving the success rate of the random access of the UE.

In an implementation, the second indication message may be configured to implicitly indicate the second random access resource. Optionally, the second indication message may be, but is not limited to be, configured to indicate a resource selection index. The resource selection index may be associated with an item in the alternative random access resource pool or other random access resources different from the alternative random access resource pool.

In another implementation, the second indication message may be configured to explicitly indicate the second random access resource. Optionally, the second indication message may be, but is not limited to be, directly configured to configure the second random access resource.

In some optional embodiments, the base station may send the second indication message to the UE in any one of the following ways, but not limited to, the following ways. The second indication message is configured to indicate the UE to determine the second random access resource. In an implementation, the base station may send a random access response message carrying the second indication message.

In another implementation, the base station may send an RRC message carrying the second indication message.

In the above-mentioned embodiment, the base station may send the second indication message to the UE through, but not limited to, an RAR message or the RRC message, so that the UE determines the second random access resource for resource fallback based on the second indication message. This avoids random access failure caused by the fact that the UE always initiates the random access on the first random access resource until the maximum number of the random accesses is reached, thus improving the success rate of the random access of the UE.

In some optional embodiments, referring to FIG. 11, FIG. 11 is a flow chart showing a random access method according to an embodiment. The method may include a step as follows.

In step 1101, a third indication message is sent.

In the embodiment of the present disclosure, the third indication message is configured to configure a priority order of multiple resources in a specified random access resource pool corresponding to other network slices except the target network slices, and the target network slice are network slices for a UE to initiate a random access. That is, the target network slices may be network slices in which the UE is triggered to initiate the random access.

In the above-mentioned embodiment, the base station may configure and send the priority order of the multiple resources in the specified random access resource pool corresponding to the other network slices for the UE, so that the UE may determine the second random access resource for resource fallback. This avoids random access failure caused by the fact that the UE always initiates the random access on the first random access resource until the maximum number of the random accesses is reached, thus improving the success rate of the random access of the UE.

In some optional embodiments, referring to FIG. 12, FIG. 12 is a flow chart showing a random access method according to an embodiment. The method may include a step as follows.

In step 1201, a fourth indication message is sent.

In the embodiment of the present disclosure, the base station may configure a priority order of multiple other random access resources corresponding to the target network slices through the fourth indication message, and the target network slices are network slice for a UE to initiate a random access. That is, the target network slices may be network slices for which the UE is triggered to initiate the random access. Based on the second indication message, the UE may determine the priority order of the multiple other random access resources corresponding to the target network slices. Further, in case that the UE needs to perform the resource fallback, the second random access resource for resource fallback may be determined based on the priority order of the multiple other random access resources corresponding to the target network slices.

In the above-mentioned embodiment, the base station may configure and send the priority order of the multiple other random access resources corresponding to the target network slices for the UE, so that the UE may determine the second random access resource for resource fallback. This avoids random access failure caused by the fact that the UE always initiates the random access on the first random access resource until the maximum number of the random accesses is reached, thus improving the success rate of the random access of the UE.

In some optional embodiments, the resource configuration information issued by the base station may also be configured to configure at least one of a first fallback number threshold and a first fallback timer.

The first fallback number threshold is configured to indicate the cumulative number of failures allowed to initiate the random access based on the first random access resource before falling back to the second random access resource for the random access. The first fallback timer is configured to indicate a cumulative duration allowed to initiate the random access based on the first random access resource before falling back to the second random access resource for the random access.

In the above-mentioned embodiment, at least one of the first fallback number threshold and the first fallback timer may be directly configured for the UE through the resource configuration information. This avoids random access failure caused by the fact that the UE always initiates the random access on the first random access resource until the maximum number of the random accesses is reached, thus improving the success rate of the random access of the UE.

In some optional embodiments, referring to FIG. 13, FIG. 13 is a flow chart showing a random access method according to an embodiment. The method may include a step as follows.

In step 1301, a random access resource fallback indication message is sent.

In an embodiment of the present disclosure, the base station may indicate the UE to perform the resource fallback by issuing the random access resource fallback indication message.

In an implementation, the base station may send a RAR message carrying the random access resource fallback indication message. In another implementation, the base station may send an RRC message carrying the random access resource fallback indication message.

In the above-mentioned embodiment, the base station may indicate the UE to perform the resource fallback by sending the random access resource fallback indication message. This avoids random access failure caused by the fact that the UE always initiates the random access on the first random access resource until the maximum number of the random accesses is reached, thus improving the success rate of the random access of the UE.

In some optional embodiments, the random access resource fallback indication message issued by the base station may be configured to configure at least one of a second fallback number threshold and a second fallback timer.

The second fallback number threshold is configured to indicate the cumulative number of failures allowed to initiate the random access based on the second random access resource before falling back from the second random access resource to the first random access resource to initiate the random access. The second fallback timer is configured to indicate a cumulative duration allowed to initiate the random access based on the second random access resource before falling back from the second random access resource to the first random access resource to initiate the random access.

In case that the first random access resource includes the resources in the specified random access resource pool corresponding to the target network slices, the UE may preferentially fall back to the resources in the specified random access resource pool corresponding to the target network slices.

In the above-mentioned embodiment, at least one of the second fallback number threshold and the second fallback timer may be configured for the UE through the random access resource fallback indication message issued by the base station. It is possible to avoid the problem that the UE always initiates the random access on a second random access resource fallen back to until the maximum number of the random accesses is reached, which also leads to random access failure, thus improving the success rate of the random access of the UE.

In some optional embodiments, the random access resource fallback indication message may carry a fallback-Factor. Alternatively, the fallbackFactor may include a fallback probability value. In the above-mentioned embodiment, the base station may carry the fallback probability value in the random access resource fallback indication message, so that the UE may perform a probability fallback.

In some optional embodiments, the resource configuration information carries a fallback probability value.

In the above-mentioned embodiment, the base station may carry the fallback probability value in the resource configuration information, so that the UE may perform a probability fallback.

In some optional embodiments, the base station may send a paging message carrying slice information of the target network slices to the UE when paging the UE, so that the UE may determine the slice information of the target network slices according to the paging message. The slice information of the target network slices includes, but is not limited to, at least one of single-network slice selection assistance information, a slice service type, a slice differentiator identifier, a slice index, or an operator defined access type.

In some optional embodiments, in case that the UE is triggered to initiate the random access through the PDCCH instruction, the base station may send a PDCCH instruction carrying the slice information of the target network slices to the UE, so that the UE may determine the slice information of the target network slices according to the paging message. The slice information of the target network slices includes, but is not limited to, at least one of single-network slice selection assistance information, a slice service type, a slice differentiator identifier, a slice index, or an operator defined access type.

In the above-mentioned embodiment, the base station may send the slice information of the target network slices to the UE in different ways, so that the UE may determine the first random access resource for initiating the random access based on the slice information of the target network slices and the resource configuration information, which is easy to implement and high in availability.

Figure 14:
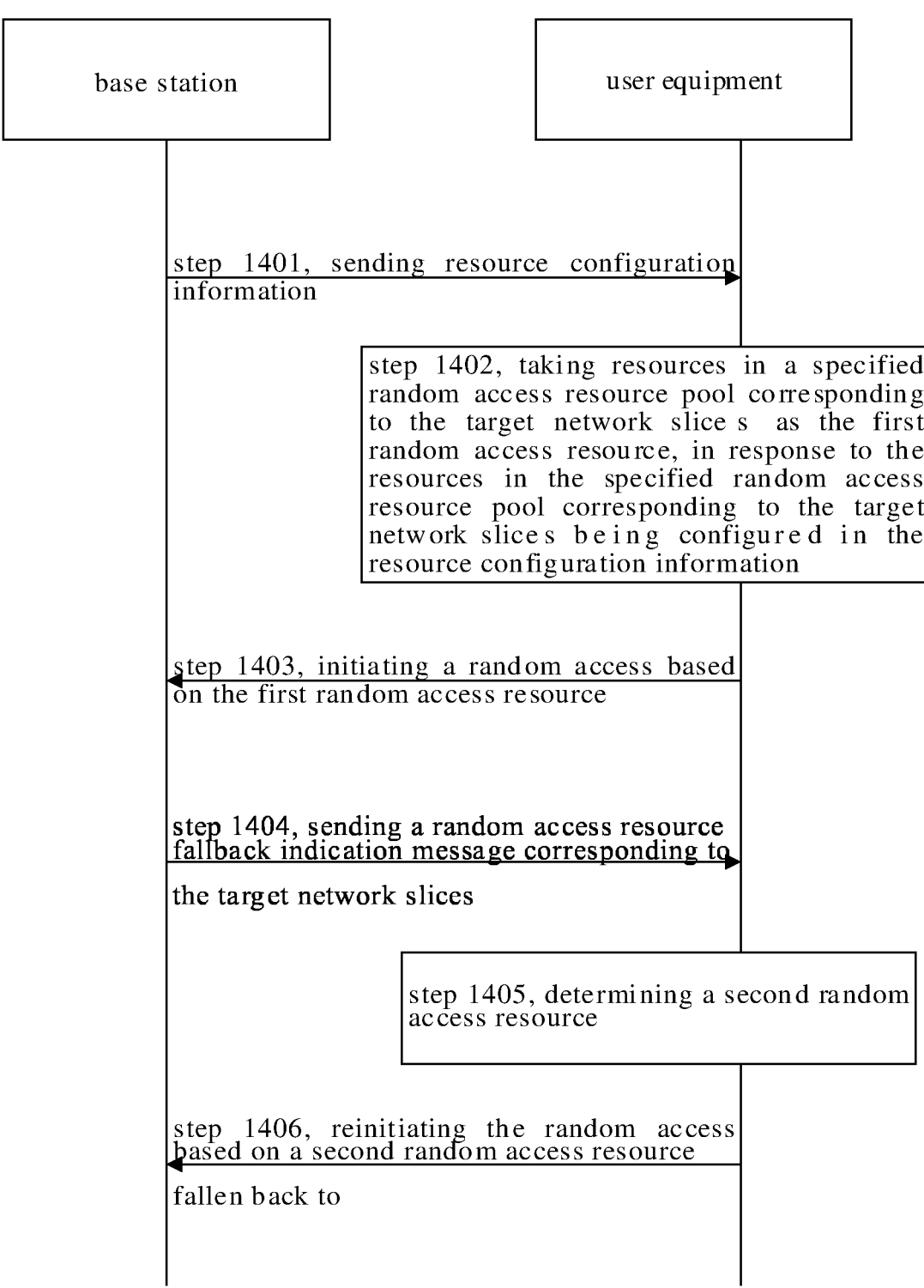
FIG. 14 is a flow chart showing another random access method according to an illustrative embodiment.

In some optional embodiments, referring to FIG. 14, FIG. 14 is a flow chart showing a random access method according to an embodiment. The method may include steps as follows.

In step 1401, a base station sends resource configuration information.

The resource configuration information is configured to configure resources in a specified random access resource pool corresponding to at least one network slice. After determining the resource configuration information, the base station sends it to the UE.

In step 1402, the UE takes resources in a specified random access resource pool corresponding to the target network slices as the first random access resource, in response to the resources in the specified random access resource pool corresponding to the target network slices being configured in the resource configuration information.

Of course, in case that the resources in the specified random access resource pool corresponding to the target network slices are not configured in the resource configuration information, the UE takes a common random access resource as the first random access resource. Here, the case is described where the resources in the specified random access resource pool corresponding to the target network slices are configured in the resource configuration information.

In step 1403, the UE initiates a random access based on the first random access resource.

In step 1404, the base station sends a random access resource fallback indication message corresponding to the target network slices.

In step 1405, the UE determines a second random access resource.

In an embodiment of the present disclosure, the UE may determine the second random access resource according to the second indication message sent by the network side. Or, the UE may determine the second random access resource in the alternative random access resource pool according to a preset priority order.

In step 1406, the UE reinitiates the random access based on a second random access resource fallen back to.

In the embodiment of the present disclosure, the second fallback number threshold and the second fallback timer are not configured in the random access resource fallback indication message. The UE may fall back to the first random access resource to reinitiate the random access, in case that the total number of the random accesses currently initiated does not reach the maximum number of the random accesses after the UE falls back from the first random access resource to the second random access resource to perform one random access failure.

At least one of the second fallback number threshold and the second fallback timer is configured in the random access resource fallback indication message. The UE may fall back to the first random access resource to reinitiate the random access, in case that the number of times of falling back to the second random access resource to reinitiate the random access reaches the second fallback number threshold, or the second fallback timer expires, and the total number of the random accesses currently initiated does not reach the maximum number of the random accesses.

It is to be understood that the above is merely an illustrative description, and one or a combination of more of the above random access solutions provided in the present disclosure all belong to the protection scope of the present disclosure.

In the above-mentioned embodiment, in a case of multiple collisions on the first random access resource, the UE may perform the resource fallback and reinitiate the random access based on the second random access resource fallen back to. This avoids random access failure caused by the fact that the UE always initiates the random access on the first random access resource until the maximum number of the random accesses is reached, thus improving the success rate of the random access of the UE.

The present disclosure also provides embodiments of an application function implementing apparatus corresponding to the above-mentioned embodiment of the application function implementing method.

Figure 15:
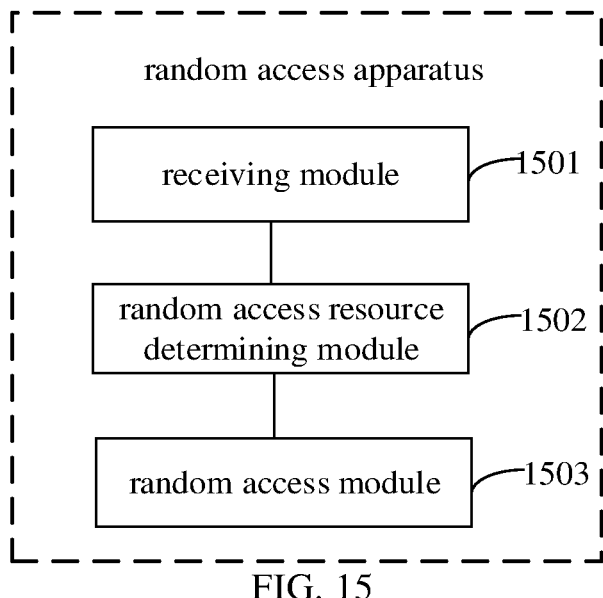
FIG. 15 is a block diagram showing a random access apparatus according to an illustrative embodiment.

Referring to FIG. 15, FIG. 15 is a block diagram showing a random access apparatus according to an illustrative embodiment. The apparatus is applied to a user equipment (UE) and includes a receiving module 1501, a random access resource determining module 1502, and a random access module 1503.

The receiving module 1501 is configured to receive resource configuration information, in which the resource configuration information is configured to configure resources in a specified random access resource pool corresponding to at least one network slice.

The random access resource determining module 1502 is configured to determine a first random access resource based on slice information of target network slices and the resource configuration information, in which the target network slices are network slices for the UE to initiate a random access.

The random access module 1503 is configured to initiate the random access based on the first random access resource.

Figure 16:
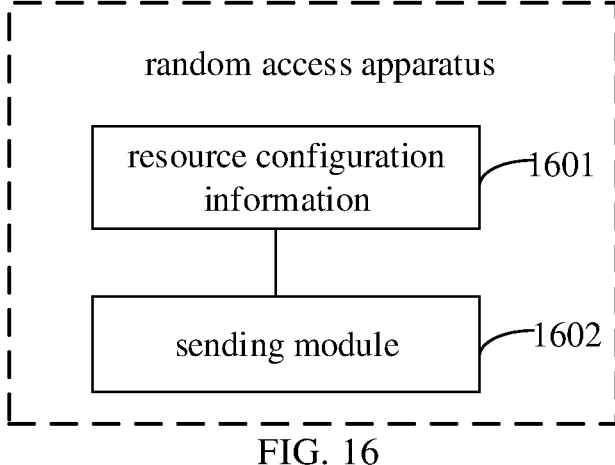
FIG. 16 is a block diagram showing another random access apparatus according to an illustrative embodiment.

Referring to FIG. 16, FIG. 16 is a block diagram showing a random access apparatus according to an illustrative embodiment. The apparatus is applied to a base station and includes a resource configuration information determining module 1601, and a sending module 1602.

The resource configuration information determining module 1601 is configured to determine resource configuration information, in which the resource configuration information is configured to configure resources in a specified random access resource pool corresponding to at least one network slice.

The sending module 1602 is configured to send the resource configuration information.

Since the apparatus embodiments substantially correspond to the method embodiments, reference is made to the partial description of the method embodiments. The above-described apparatus embodiments are merely for the purpose of illustration, in which the units described as separate components may be or may not be physically separated, and the components displayed as units may be or may not be physical units, that is, either located at one place or distributed onto a plurality of network units. The object of embodiments of the present disclosure may be achieved by some or all of the modules in accordance with practical requirements. It would be appreciated and executable by those skilled in the art without creative efforts.

In the embodiments of the present disclosure, the first random access resource for initiating the random access may be determined based on the slice information of the target network slices configured for the UE to initiate the random access and the resource configuration information sent by a network side, so that the UE may quickly complete the random access and obtain a desired slice service.

In the embodiment of the present disclosure, in a case of multiple collisions on the first random access resource, the UE may perform resource fallback and reinitiate the random access based on a second random access resource fallen back to. This avoids random access failure caused by the fact that the UE always initiates the random access on the first random access resource until the maximum number of the random accesses is reached, thus improving the success rate of the random access of the UE.

Correspondingly, the present disclosure also provides a computer-readable storage medium. The computer-readable storage medium having stored therein a computer program for executing any of the random access methods applied to a user equipment (UE) side.

Correspondingly, the present disclosure also provides a computer-readable storage medium. The computer-readable storage medium having stored therein a computer program for executing any of the random access methods applied to a base station side.

Correspondingly, the present disclosure also provides a random access device. The random access device includes a processor, and a memory for storing instructions executable by the processor, in which the processor is configured to execute any of the random access methods applied to a user equipment (UE) side.

Figure 17:
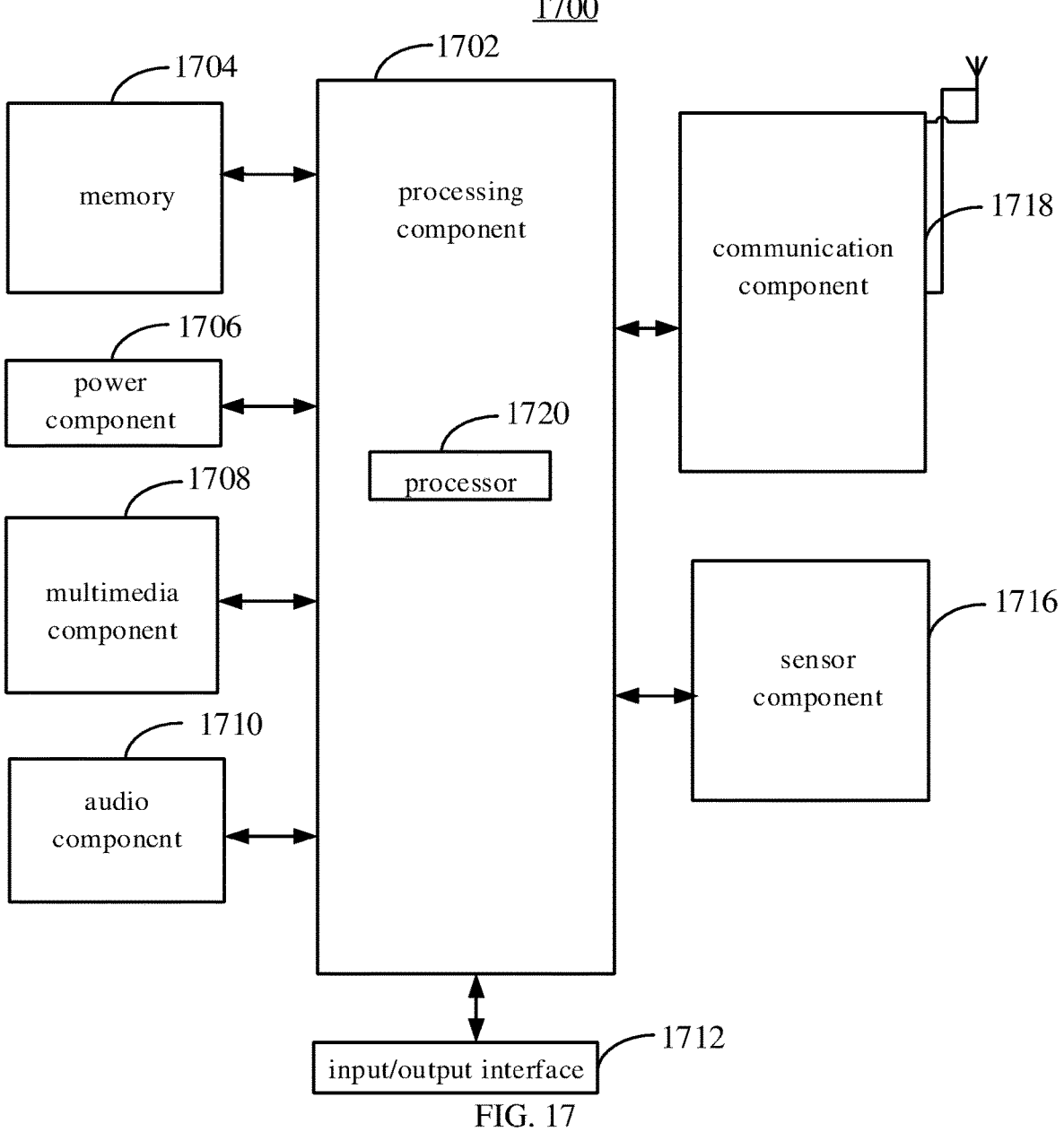
FIG. 17 is a schematic diagram showing a random access device according to an illustrative embodiment of the present disclosure.

FIG. 17 is a block diagram showing an electronic device 1700 according to an illustrative embodiment of the present disclosure. For example, the electronic device 1700 may be a user equipment (UE) such as a mobile phone, a tablet computer, an e-book reader, a multimedia playing device, a wearable device, a vehicle-mounted user equipment, an ipad, and a smart television.

Referring to FIG. 17, the electronic device 1700 may include one or more of the following components: a processing component 1702, a memory 1704, a power component 1706, a multimedia component 1708, an audio component 1710, an input/output (I/O) interface 1712, a sensor component 1716, and a communication component 1718.

The processing component 1702 typically controls overall operations of the electronic device 1700, such as the operations associated with display, phone calls, data random accesses, camera operations, and recording operations. The processing component 1702 can include one or more processors 1720 to execute instructions to perform all or some of the steps in the above-described random access methods. Moreover, the processing component 1702 may include one or more modules which facilitate the interaction between the processing component 1702 and other components. For instance, the processing component 1702 may include a multimedia module to facilitate the interaction between the multimedia component 1708 and the processing component 1702. For another example, the processing component 1702 may read executable instructions from the memory to implement steps in the random access method provided in the various embodiments described above.

The memory 1704 is configured to store various types of data to support the operation of the electronic device 1700. Examples of such data include instructions for any applications or methods operated on the electronic device 1700, contact data, phonebook data, messages, pictures, videos, etc. The memory 1704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1706 provides power to various components of the electronic device 1700. The power component 1706 may include a power management system, one or more power sources, and any other components associated with the generation, management, and distribution of power in the electronic device 1700.

The multimedia component 1708 includes a screen providing an output interface between the electronic device 1700 and the user. In some embodiments, the multimedia component 1708 includes a front camera and/or a rear camera. The front camera and/or the rear camera may receive an external multimedia datum while the electronic device 1700 is in an operation mode, such as a photographing mode or a video mode. Each of the front camera and the rear camera may be a fixed optical lens system or have focus and optical zoom capability.

The audio component 1710 is configured to output and/or input audio signals. For example, the audio component 1710 includes a microphone (MIC) configured to receive an external audio signal when the electronic device 1700 is in an operation mode, such as a call mode, a recording mode, and a voice recognition mode. The received audio signal may be further stored in the memory 1704 or transmitted via the communication component 1718. In some embodiments, the audio component 1710 further includes a speaker to output audio signals.

The I/O interface 1712 provides an interface between the processing component 1702 and peripheral interface modules, such as keyboards, click wheels, buttons, and the like. The buttons may include, but are not limited to, a home button, a volume button, a starting button, and a locking button.

The sensor component 1716 includes one or more sensors to provide status assessments of various aspects of the electronic device 1700. For instance, the sensor component 1716 may detect an open/closed status of the electronic device 1700, relative positioning of components, e.g., the display and the keypad, of the electronic device 1700, a change in position of the electronic device 1700 or a component of the electronic device 1700, a presence or absence of user contact with the electronic device 1700, an orientation or an acceleration/deceleration of the electronic device 1700, and a change in temperature of the electronic device 1700. The sensor component 1716 may include a proximity sensor configured to detect the presence of nearby objects without any physical contact. The sensor component 1716 may further include a light sensor, such as a CMOS or CCD image sensor, for use in imaging applications. In some embodiments, the sensor component 1716 may further include an accelerometer sensor, a gyroscope sensor, a magnetic sensor, a pressure sensor, or a temperature sensor.

The communication component 1718 is configured as a component that facilitates wired or wireless communication between the electronic device 1700 and other devices. The electronic device 1700 can access a wireless network based on a component standard, such as Wi-Fi, 2G, 3G, 4G, 5G, 6G or a combination thereof. In an illustrative embodiment, the communication component 1718 receives a broadcast signal or broadcast associated information from an external broadcast management system via a broadcast channel. In an illustrative embodiment, the communication component 1718 further includes a near field component (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the electronic device 1700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing any of the random access methods applied to the above-mentioned user equipment (UE) side.

In an illustrative embodiment, there is also provided a non-transitory machine readable storage medium including instructions, such as included in the memory 1704, executable by the processor 1720 in the electronic device 1700, for completing the above-mentioned random access method. For example, the non-transitory computer-readable storage medium may be a ROM, a random access memory (RAM), a CD-ROM, a magnetic tape, a floppy disc, an optical data storage device, and the like.

Correspondingly, the present disclosure also provides a random access device. The random access device includes a processor, and a memory for storing instructions executable by the processor, in which the processor is configured to execute any of the random access methods applied to above-mentioned base station side.

Figure 18:
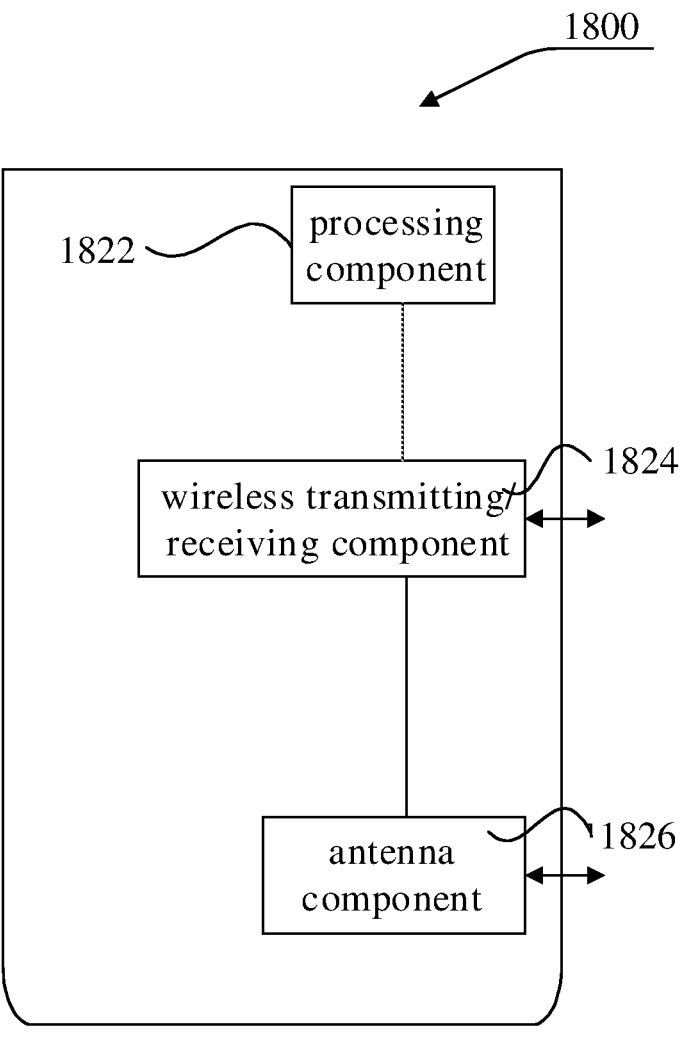
FIG. 18 is a schematic diagram showing another random access device according to an illustrative embodiment of the present disclosure.

As shown in FIG. 18, FIG. 18 is a schematic diagram showing a random access device 1800 according to an illustrative embodiment of the present disclosure. The device 1800 may be provided as a base station. Referring to FIG. 18, the device 1800 includes a processing component 1822, a wireless transmitting/receiving component 1824, an antenna component 1826, and a signal processing part unique to a wireless interface, and the processing component 1822 may further include one or more processors.

One of the processing component 1822 may be configured to execute any of the random access methods applied to above-mentioned base station side.

Other embodiments of the present disclosure will be apparent to those skilled in the art from consideration of the specification and practice of the present disclosure described here. The present disclosure is intended to cover any variations, uses, or adaptations of the embodiments of the present disclosure following the general principles thereof and including such departures from the embodiments of the present disclosure as come within known or customary practice in the art. It is intended that the specification and examples be considered as exemplary only, with a true scope and spirit of the embodiments of the present disclosure being indicated by the following claims.

It will be appreciated that the embodiments of the present disclosure are not limited to the exact construction that has been described above and illustrated in the accompanying drawings, and that various modifications and changes can be made without departing from the scope thereof. It is intended that the scope of the embodiments of the present disclosure only be limited by the appended claims.

What is claimed is:

1. A random access method, applied to a user equipment (UE), comprising:

receiving resource configuration information, wherein the resource configuration information is configured to configure resources in a specified random access resource pool corresponding to at least one network slice;

determining a first random access resource based on slice information of target network slices and the resource configuration information, wherein the target network slices are network slices for the UE to initiate a random access; and initiating the random access based on the first random access resource;

wherein a number of the target network slices is multiple, and determining the first random access resource based on the slice information of the target network slices and the resource configuration information comprises:

taking resources in a specified random access resource pool corresponding to one target network slice of multiple target network slices as the first random access resource based on a priority order of the multiple target network slices and the resource configuration information.

2. The random access method of claim 1, wherein determining the first random access resource based on the slice information of the target network slices and the resource configuration information comprises taking resources in a specified random access resource pool corresponding to the target network slices as the first random access resource, in response to the resources in the specified random access resource pool corresponding to the target network slices being configured in the resource configuration information.

3. The random access method of claim 1, wherein receiving the resource configuration information comprises one of:
- receiving a system message carrying the resource configuration information;
- receiving a physical downlink control channel (PDCCH) instruction carrying the resource configuration information; or
- receiving a radio resource control (RRC) message carrying the resource configuration information.

4. The random access method of claim 1, wherein determining the first random access resource based on the slice information of the target network slices and the resource configuration information comprises at least one of:
- determining, by the UE, the priority order of the multiple target network slices based on service priorities; or
- determining the priority order of the multiple target network slices based on a received first indication message.

5. The random access method of claim 1, further comprising:
- reinitiating the random access based on a second random access resource fallen back to, in response to satisfying a preset fallback condition;
- wherein the second random access resource is one of alternative random access resource pools, and the alternative random access resource pools comprise at least one of:
- resources in a specified random access resource pool corresponding to other network slices, other random access resources corresponding to the target network slices, or common random access resources; or
- the second random access resource is a random access resource which is determined based on a received second indication message.

6. The random access method of claim 5, wherein a number of the resources in the specified random access resource pool corresponding to the other network slices is multiple, and the method further comprises one of:
- determining a priority order of multiple resources in the specified random access resource pool corresponding to the other network slices by the UE in a preset way;
- determining a priority order of multiple resources in the specified random access resource pool corresponding to the other network slices based on a received third indication message;
- determining a priority order of multiple other random access resources corresponding to the target network slices by the UE in a preset way;
- determining a priority order of multiple other random access resources corresponding to the target network slices based on a received fourth indication message; or
- determining the second random access resource in the alternative random access resource pools according to a preset priority order of random access resources.

7. The random access method of claim 5, further comprising one of:
- the second indication message being configured to indicate a resource selection index;
- the second indication message being configured to configure the second random access resource;
- receiving a random access response message carrying the second indication message; or
- receiving a radio resource control (RRC) message carrying the second indication message.

8. The random access method of claim 5, wherein the preset fallback condition comprises one of:
- a number of failures of initiating the random access based on the first random access resource reaching a first fallback number threshold;
- a first fallback timer expiring;
- receiving a random access resource fallback indication message corresponding to the target network slices;
- receiving a random access response message carrying the random access resource fallback indication message; or
- receiving an RRC message carrying the random access resource fallback indication message,
- wherein the resource configuration information is further configured to configure at least one of the first fallback number threshold or the first fallback timer.

9. The random access method of claim 8, wherein the random access resource fallback indication message is configured to configure at least one of a second fallback number threshold or a second fallback timer, wherein the random access resource fallback indication message carries a fallback probability value, and reinitiating the random access based on the second random access resource fallen back to comprises: falling back in response to a generated random number and the fallback probability value, and reinitiating the random access based on the second random access resource fallen back to.

10. The random access method of claim 5, wherein the resource configuration information carries a fallback probability value, and reinitiating the random access based on the second random access resource fallen back to comprises: falling back in response to a generated random number and the fallback probability value, and reinitiating the random access based on the second random access resource fallen back to.

11. The random access method of claim 1, further comprising one of: acquiring the slice information of the target network slices sent by a non-access stratum to an access stratum in response to the non-access stratum requests the access stratum to initiate an RRC connection; receiving a paging message carrying the slice information of the target network slices; receiving a physical downlink control channel (PDCCH) instruction carrying the slice information of the target network slices; or taking slice information associated with a logical channel with data to be transmitted as the slice information of the target network slices, in case of a logical channel identifier being associated with the slice information associated with the logical channel with the data to be transmitted.

12. A random access method, applied to a base station, comprising:
- determining resource configuration information, wherein the resource configuration information is configured to configure resources in a specified random access resource pool corresponding to at least one network slice; and
- sending the resource configuration information;
- wherein sending the resource configuration information comprises:
- sending a first indication message, wherein the first indication message is configured to configure a priority order of multiple target network slices, and the target network slices are network slices for a user equipment (UE) to initiate a random access,
- wherein the priority order of the multiple target network slices and the resource configuration information are configured for the UE to determine a first random access resource for initiating the random access, and the first random access resource is a resource in a specified random access resource pool corresponding to a target network slice among the multiple target network slices.

13. The random access method of claim 12, wherein sending the resource configuration information further comprises one of:

broadcasting a system message carrying the resource configuration information;

sending a physical downlink control channel (PDCCH) instruction carrying the resource configuration information; or sending a radio resource control (RRC) message carrying the resource configuration information.

14. The random access method of claim 12, further comprising:

sending a second indication message, wherein the second indication message is configured for a user equipment (UE) to determine a second random access resource which is used when resource fallback is performed, wherein the second indication message is configured to indicate a resource selection index or to configure the second random access resource, wherein sending the second indication message comprises one of:

sending a random access response message carrying the second indication message; or sending a radio resource control (RRC) message carrying the second indication message.

15. The random access method of claim 12, further comprising one of:

sending a third indication message, wherein the third indication message is configured to configure a priority order of multiple resources in a specified random access resource pool corresponding to other network slices except the target network slices, and the target network slices are network slices for a UE to initiate a random access; or sending a fourth indication message, wherein the fourth indication message is configured to configure a priority order of multiple other random access resources corresponding to the target network slices, and the target network slices are network slices for a user equipment (UE) to initiate a random access.

16. The random access method of claim 12, further comprising:

sending a random access resource fallback indication message, wherein sending the random access resource fallback indication message comprises one of:

sending a random access response message carrying the random access resource fallback indication message; or sending a radio resource control (RRC) message carrying the random access resource fallback indication message.

17. The random access method of claim 16, wherein the random access resource fallback indication message is configured to configure at least one of a second fallback number threshold or a second fallback timer, wherein the random access resource fallback indication message carries a fallback probability value.

18. The random access method of claim 16, wherein the resource configuration information carries a fallback probability value.

19. The random access method of claim 16, further comprising at least one of:

sending a paging message carrying slice information of the target network slices; or sending a physical downlink control channel (PDCCH) instruction carrying slice information of the target network slices.

20. A random access device, comprising:

a processor; and a memory for storing instructions executable by the processor;

wherein the processor is configured to perform the method of claim 1.

* * * * *